United States Patent [19]

Schmöde

[11] Patent Number: 5,008,165

[45] Date of Patent: Apr. 16, 1991

[54] ELECTROCHEMICAL CELL

[75] Inventor: Hans-Peter Schmöde, Brilon, Fed. Rep. of Germany

[73] Assignee: Accumulatorenwerke Hoppecke Carl Zoellner Sohn GmbH & Co. KG, Brilon, Fed. Rep. of Germany

[21] Appl. No.: 401,018

[22] Filed: Aug. 31, 1989

[30] Foreign Application Priority Data

Aug. 31, 1988 [DE] Fed. Rep. of Germany ....... 3829419

[51] Int. Cl.⁵ ...................... H01M 10/40; H01M 2/16
[52] U.S. Cl. ..................................... 429/94; 429/196; 429/251
[58] Field of Search .......................... 429/94, 251, 196

[56] References Cited

U.S. PATENT DOCUMENTS 3,960,595  6/1976  Lehmann et al. ............... 429/198 X
4,333,944  6/1982  Urry ..................................... 429/94
4,450,213  5/1984  Dey et al. ........................ 429/194 X

FOREIGN PATENT DOCUMENTS 2304424  8/1973  Fed. Rep. of Germany .
3301297  7/1983  Fed. Rep. of Germany .
3321129  10/1984 Fed. Rep. of Germany .
3412890  10/1984 Fed. Rep. of Germany .
1088271  4/1963  United Kingdom ................. 429/94

Primary Examiner—Stephen J. Kalafut
Attorney, Agent, or Firm—Robert W. Becker & Associates

[57] ABSTRACT

An electrochemical cell, especially of winding construction, having an anode, especially a lithium anode, that includes two anode strips that are superimposed on one another. The anode is wound on the outside. In order to reduce the lithium supply in the outermost anode layer, so that no free lithium is present in an empty cell, one of the anode strips is shorter than the other anode strip in such a way that the outermost anode layer of the cell includes only a single anode strip.

11 Claims, 5 Drawing Sheets

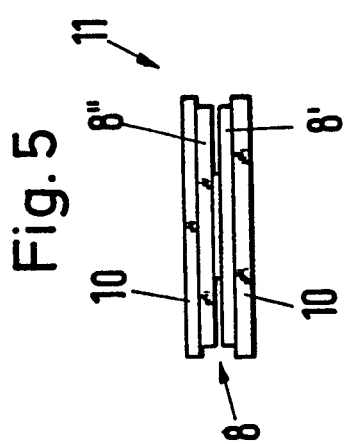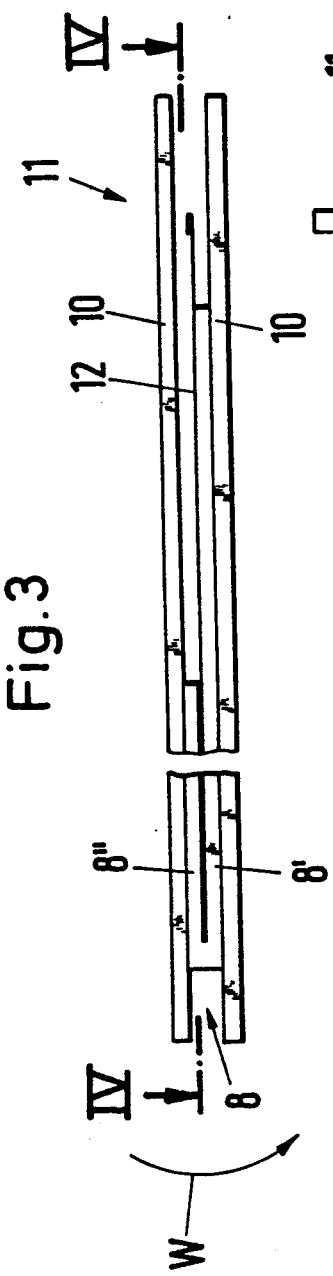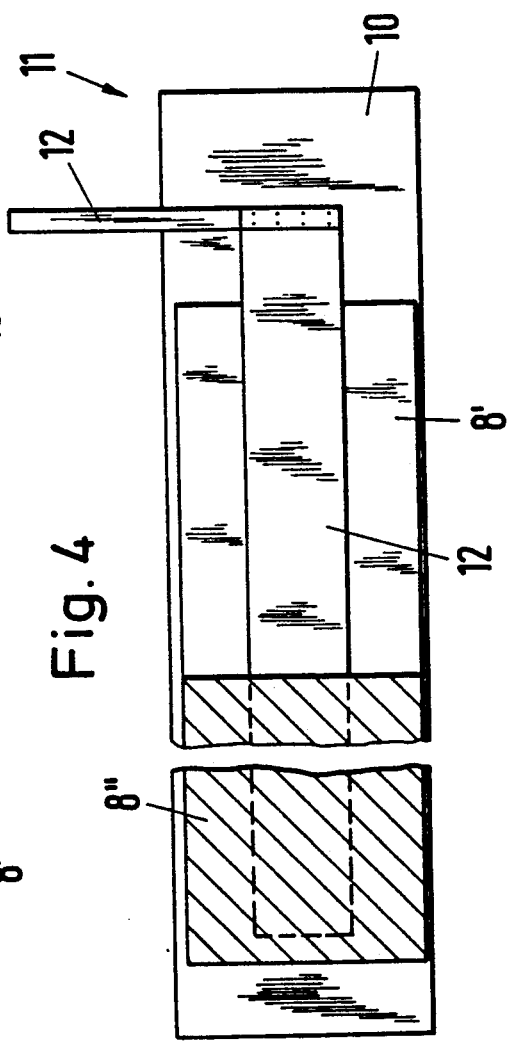

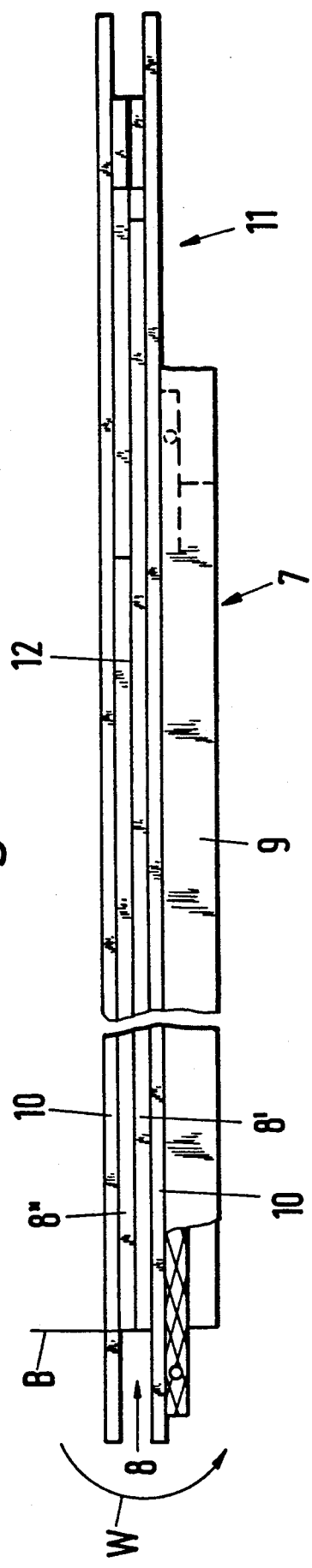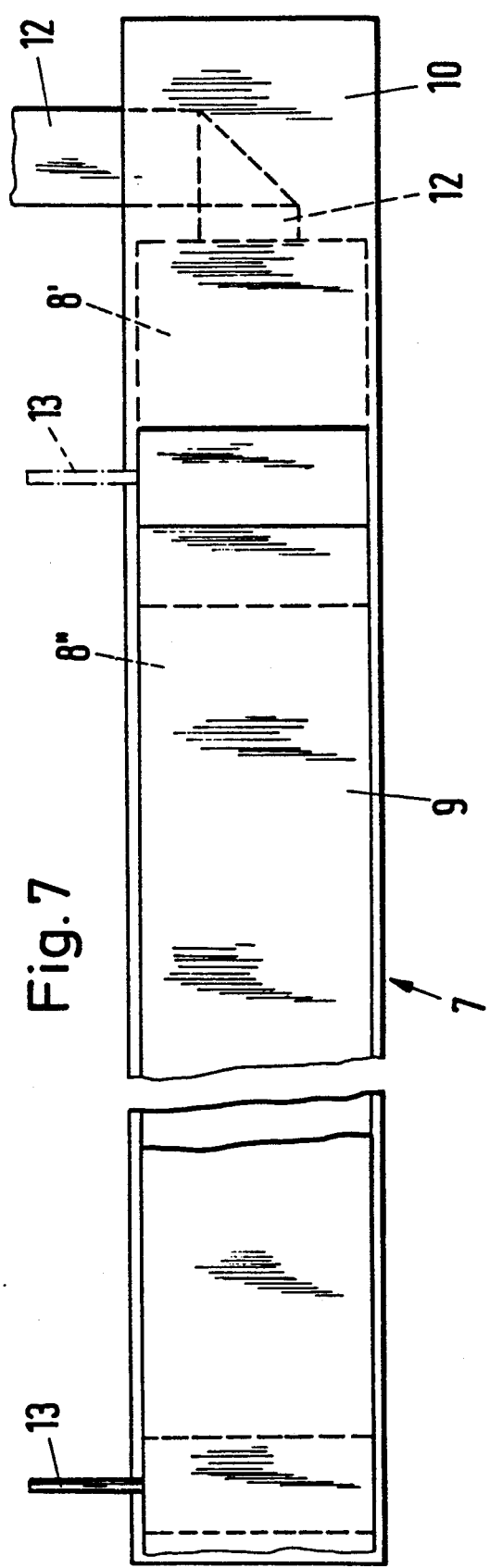

ELECTROCHEMICAL CELL

BACKGROUND OF THE INVENTION

1. Field of the Invention

The present invention relates to an electrochemical cell, where the electrodes, namely the anode and cathode, accompanied by the respective interposition of separators, are disposed in a circular arrangement in alternate layers from the inside toward the outside.

The electrochemical cell of the present invention is related in particular to a lithium cell having a lithium anode for high-power use, with the cathode preferably being a $MnO_2$ cathode; however, other materials could also be used for the cathode.

The "circular arrangement" of the cell refers either to a bobbin construction or a winding construction. In a bobbin construction, the electrodes are embodied as cylindrical tubes and, while being separated by a similarly cylindrical separator, are telescoped within one another. In a winding construction, the components, including the electrodes and separators, are superimposed over one another as long strips and are rolled to form a tight helical winding. The highest electrical outputs can be achieved with a winding construction.

The use of lithium as anode material has the advantage that this element has the greatest negative potential of all elements, as well as the highest capacity per specific weight of all anode materials. For this reason, lithium cells form high output cells. The lithium anode can be combined with a cathode of, for example, manganese dioxide ($MnO_2$), in other words, with a cathode of solid material. Liquid cathodes would also be conceivable.

One problem with electrochemical cells of the aforementioned general type is the outermost electrode layer. Thus, for example with lithium cells, especially of winding construction, more lithium is provided in the outermost lithium layer than can be discharged via the adjacent counterelectrode. Thus, the capacity of the outermost lithium layer cannot be completely tapped since no adequately dimensioned counter-electrode is available. However, an optimum efficient utilization of the available volume, especially when cathodes of solid material are used, is possible only if the capacity of the anode and cathode in the outer layer of an electrode winding are coordinated with one another. The same situation naturally also applies for a bobbin construction.

An excess of free lithium in a discharged cell represents an acute safety risk if the cell is mishandled, for example due to polarity reversal or charging. This can lead to explosion of the cell, which of course represents a very great danger that an accident will occur. This danger exists in particular if several cells are connected together in a battery. In such a situation, the cell having the least capacity at the conclusion of discharging has its polarity reversed by the remaining cells. In order to preclude the aforementioned danger of an accident occurring, it has up to now been customary for the faulty current that results from the polarity reversal in batteries having lithium high-output cells to be partially taken over by a diode that is connected in parallel. However, this protective measure in the form of a diode is technically complicated.

2. Description of the Prior Art

German Offenlegungsschrift 33 01 297 discloses an electrochemical cell of winding construction having a lithium anode comprised of two superimposed anode strips. Embedded between the anode strips is a copper strip that is intended to prevent damage to the cell during irregular operation. Electrochemical cells are furthermore known where a separator of micro glass fibers is disposed between the electrodes, with the cells having an electrolyte. With a separator of micro glass fibers, use is made of the positive properties with regard to the chemical resistance as well as the electrical properties that such separators provide. Unfortunately, the known fabrics (papers) of micro glass fibers, as they are used for separators, also have drawbacks. On the one hand, such separators have an only slight mechanical stability and strength, and can therefore be loaded only slightly. The result can be that in winding cells having cathodes that increase in volume during discharge of the cell, as is the case, for example, with $MnO_2$ cathodes, the separators can become damaged during the discharge. This can lead to uncontrollable consequences, so that due to the non-achieved necessary strength factors of the separators, the safety is endangered. On the other hand, due to the inadequate tightness or sealing of the heretofore known separators, the danger exists that the anode material will press through the existing faulty locations. This is in particular the case where soft lithium is the anode material.

For this reason, for example with lead storage batteries, it has already been proposed to strengthen the micro glass fibers of the separators via a binder; unfortunately, this binder is unstable in organic solvents.

German Offenlegungsschrift 33 23 233 furthermore proposes a separator of micro glass fibers that are strengthened via a binder, for example in the form of polyvinyl alcohol. In this case, however, the cells have liquid positive electrodes.

A further problem of electromechanical cells, and in particular lithium cells, is represented by the high output range, especially during operation. Up to now, lithium batteries with organic electrolytes have been usable only to a limited extent at low temperatures of up to $-30°$ C., since the voltage state and derivable capacity greatly drop at temperatures below $0°$ C., especially at high loads. As a result, the advantages of lithium cells having non-toxic organic electrolytes cannot be used in some applications.

A further problem exists in the provision of a stable separator binder/electrolyte combination. This is so because it has been shown that certain separator binders often cannot be used in cells having organic electrolytes.

German Patent 23 04 424 discloses an electrochemical cell having an electrolyte that provides a mixture of dioxolane with ethylene carbonate.

It is an object of the present invention, starting with an electrochemical cell, especially a lithium cell, of the aforementioned general type, to increase the safety of the cell without great technical complexity or expense.

BRIEF DESCRIPTION OF THE DRAWINGS

This object, and other objects and advantages of the present invention, will appear more clearly from the following specification in conjunction with the accompanying schematic drawings, in which:

FIG. 3 is a side view of an anode packet of the inventive electrochemical cell prior to being wound;

FIG. 4 is a cross-sectional view taken along the line IV—IV in FIG. 3;

FIG. 5 is an end view of the anode packet of FIG. 3;

FIG. 6 is a side view of an electrode packet of the inventive electrochemical cell prior to being wound;

FIG. 7 is a view of the electrode packet of FIG. 6 from below; and

SUMMARY OF THE INVENTION

Figure 1:
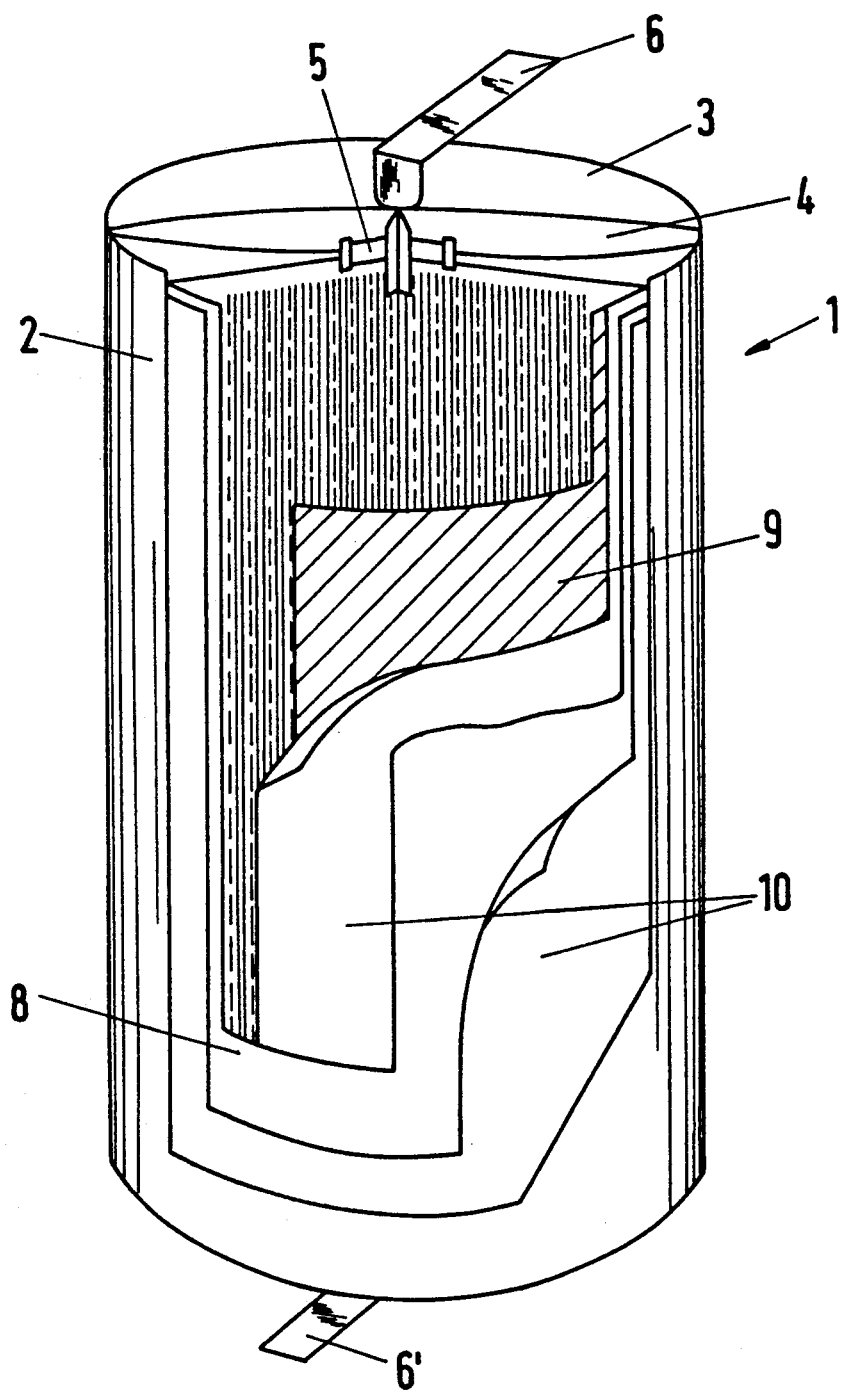
FIG. 1 is a perspective view of one exemplary embodiment of the inventive electrochemical cell, a sector-like portion of which has been cut away to make the interior of the cell visible.

The electrochemical cell of the present invention is characterized primarily in that the most outwardly disposed electrode layer of the cell has a thickness that is less than the thickness of each corresponding more inwardly disposed electrode layer of the cell, and in particular is essentially half as thick as are the corresponding more inwardly disposed electrode layers.

An electrochemical cell constructed in conformity with the present invention has the advantage that its safety is improved very significantly without in so doing requiring any special technical complexity. The basic concept is to reduce the supply of electrode material in the outermost electrode layer. For example, with a lithium anode the idea is to reduce the supply of lithium. In addition to advantageously obtaining a minimum of volume, there is no longer any free lithium in an empty lithium cell, since the cell does not contain more active material than can actually be discharged. In so doing, the capacity of the cell can be structurally determined very precisely, and its functional efficiency can be maintained very precisely. This is a distinct advantage with regard to safety if the cell is mishandled by having the polarity thereof reversed or due to discharging. In particular, the cells are also safe without having to take special protective measures in the form of diodes.

The inventive concept can be used both for electrochemical cells of so-called bobbin construction as well as cells of winding construction.

Proceeding from an electrochemical cell of winding construction, where the anode, especially a lithium anode, comprises two anode strips that are superimposed over one another, it is proposed pursuant to a further development of the present invention that the anode in the cell be wound on the outside, and that one anode strip be shorter than the other anode strip to such an extent that the outermost anode layer of the cell comprise only a single anode strip.

Such a cell, especially a lithium cell of socalled winding construction, can be manufactured in a very straightforward manner. In so doing, the anode foils are wound with the corresponding counter-electrodes, whereby one anode strip of the anode is of normal length, while the other anode strip is shorter than the first strip. In so doing, the outermost anode layer is half as thick as is an anode layer further within the cell, so that the outermost anode layer is completely used up over the life of the cell. With a lithium cell, a cathode of solid material, preferably manganese dioxide, is used in particular as the cathode.

The outer anode strip is advantageously shorter than the inner anode strip of the outermost anode layer.

Pursuant to a further development of the present invention, it is proposed that a shunt strip of electrically conductive material, especially copper, be disposed between the two anode strips. This inserted shunt foil has the advantage that the appropriate terminal of the cell can be guided to the outside in a technically straightforward manner.

The two anode strips are preferably fixedly connected to one another, especially by being pressed together. This is particularly advantageous with a lithium anode, since the lithium is a very soft metal, so that by merely exerting pressure, the anode strips can be permanently pressed together.

Pursuant to a further inventive development of the separator, it is proposed that the separator be made of microfibers, especially micro glass fibers, that are strengthened or set via a binder. The binder of the separator is preferably a butadiene rubber.

The advantage of using a binder for the separator is that the separator can be made very thin, thus assuring a high efficiency of the cell. The fleece or fabric has a very good mechanical stability, is resistant to breaking, and for many fabrication techniques is adequately pull-resistant, so that it can, for example, be used on automatic winding machines for producing winding cells. At the same time, the fabric has the necessary density or tightness to protect against forcing or pressing through, especially through soft lithium anodes, thus in particular assuring a high safety and reliability of the cell. This is also applicable for the case where the cell is erroneously charged. Despite the butadiene rubber as the binder for the separator, a high porosity of about 90% is assured, so that the corresponding electrochemical cell is suitable as a high output cell. Thus, for example, it is possible to provide a prismatic lithium-$MnO_2$ high output cell of 2.8 V, 60 Ah as well as 120 A, that can be operated up to temperatures of 150° C. at the end of the discharge.

The butadiene rubber preferably contains up to preferably 40% acrylonitrile, up to preferably 5% methacrylic acid, and up to preferably 55% butadiene. This material is manufactured by the company BASF under the tradename "Perbunan NKA 8250".

The binder content is between 2 and 10%, preferably 7%, by weight of microfibers.

In addition, the weight per unit area of the separator is preferably approximately 50 g/$m^2$.

Pursuant to a further development of the electrolyte of the inventive electrochemical cell, it is proposed that the electrolyte be an organic electrolyte.

This is so because it has been shown that a separator having butadiene rubber as a binder can surprisingly be used in cells, especially lithium cells, that have an organic electrolyte. A chemically stable separator binder/electrolyte combination is thus provided. In addition to the chemical stability Of the butadiene rubber in organic electrolytes, it is also thermally stable. However, the chemical stability of the butadiene rubber with respect to the organic electrolyte is a further safety benefit of the electrochemical cell, since the separator can reliably fulfill the requirements made thereof over the entire life of the cell.

Pursuant to a further development of the organic electrolyte of the inventive electrochemical cell, it is proposed that this electrolyte be an organic solvent mixture of ethylene carbonate and dioxolane in which is dissolved a conducting salt in the form of the salt of perchloric acid. With an electrolyte of this type in conjunction with the butadiene rubber as a binder for the separator, a lithium high-output cell, especially with a $MnO_2$ cathode, is provided that is suitable for low temperatures up to −30° C. as well as for high loads, with the electrolyte increasing the power state, especially at these low temperatures of −30° C. Thus, at −30° C. approximately the same output features are achieved as are otherwise obtained at 0° C. with conventional electrolytes. The inventive electrolytes are economical components that above all are also non-polluting and in contrast to other electrolytes do not contain arsenic, fluorine, nitriles, acids, or chlorinated hydrocarbons.

The essential feature of an electrolyte that is suitable for low temperatures and high loads is its ability, under these two conditions to dissolve as great a concentration as possible of a conducting salt. These properties are achieved by using an organic substance that has a very high dielectric constant. Under normal conditions this substance is a solid and in the liquid state can dissolve a very large quantity of a conducting salt. In this connection, the favorable low temperature properties are achieved by diluting this basic electrolyte with a suitable solvent, which preferably comprises fivecomponent heterocyclic rings. All of these conditions are fulfilled by the inventive organic solvent mixture that has dissolved therein conducting salt in the form of a salt of perchloric acid, with the cation of this salt being formed by the anode element.

Pursuant to one advantageous further electrolyte, the latter is a solution of 1 mol ethylene carbonate in approximately 11 mol 1,3 dioxolane. This corresponds to 1.2 mol/l ethylene carbonate and 13.2 mol/l dioxolane, i.e. 8% by volume ethylene carbonate and 92% by volume dioxolane, or 9.8% by weight ethylene carbonate and 90.2% by weight dioxolane.

The conducting salt is dissolved in the solvent mixture in an amount up to 1 to 2.5 mol/l, especially 1.75 to 2 mol/l. This is particularly true where the conducting salt is $LiClO_4$.

Further specific features of the present invention will be described in detail subsequently.

DESCRIPTION OF PREFERRED EMBODIMENTS

Referring now to the drawings in detail, FIG. 1 illustrates an electrochemical cell 1 of winding construction. In order to be able to see the interior of the cell 1, in the drawing a sector-like portion of the cell has been cut away, whereby in particular the outer layers are visible.

The cell 1 comprises a cylindrical casing 2 that is made in particular of stainless steel. The two end faces of the cylindrical casing 2 are each welded to a cover 3, which is filled with a sealing compound or filler 4. Disposed in the upper cover 3 is a glass/metal terminal insulator 5 through which extends a connection or terminal lug 6 for one terminal of the cell 1. In the lower region of the cell 1, the casing 2 has a corresponding connection or terminal lug 6' for the other terminal of the cell 1.

Figure 2:
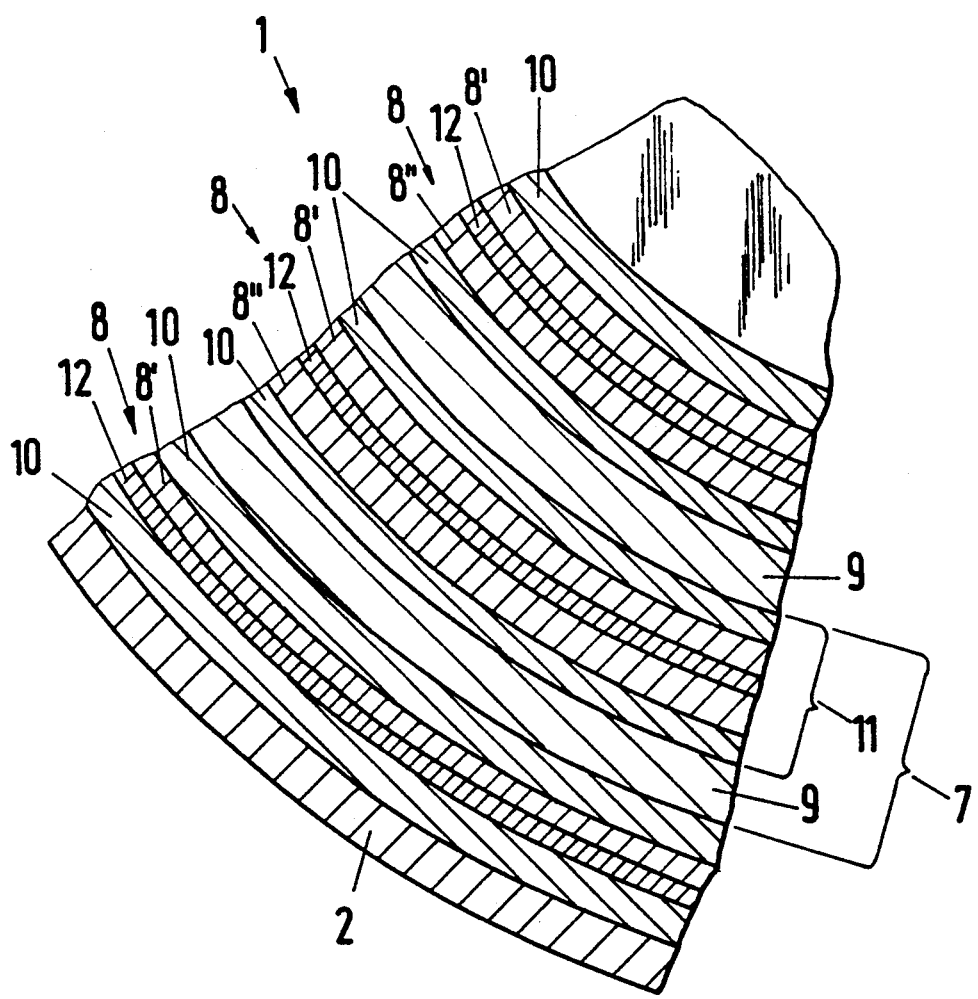
FIG. 2 is an enlarged view that shows a sector-like cut-away portion of the electrochemical cell of FIG. 1 in an enlarged view.

Disposed within the casing 2 is a spirally wound electrode packet, reference being made to FIGS. 2, 6 and 7. This packet comprises a lithium anode 8 and a cathode 9, especially a cathode of solid material, such as $MnO_2$. Disposed between the anodes 8 and the cathodes 9 are respective separators 10. The particular construction of the electrode packet 7 will be described subsequently, and is shown in FIGS. 3 to 7 prior to the winding and in FIG. 2 after the winding in a sector-like cutout of the cell 1.

The drawings illustrate the anode packet 11 of the electrode packet 7 and there is noted that reference numerals in different Figures are intended to refer to like elements. The anode or positive electrode plate 8 comprises two anode strips 8', 8" that are in the form of foils and between which is disposed a shunt strip 12. As can be seen, the shunt strip 12 is sandwiched between the two superimposed anode strips 8', 8". The shunt strip 12 can, for example, be made of copper. One end of the shunt strip 12 sticks out and is bent off by 90° to form the connection for the anode terminal of the cell 1; this can be seen in particular in FIG. 4.

FIGS. 3 and 4 clearly show that the one anode strip 8" is shorter than the other anode strip 8', and in particular in such a way that in the wound state of the electrode packet 7, the outermost layer of the anode 8 has only a single anode strip, namely the standard length anode strip 8'. Thus, in comparison to the inwardly disposed anode plies, the outermost anode ply is only half as thick, since in the interior of the cell 1 each anode layer is formed not only by the anode strip 8' but also by the anode strip 8". This can be seen in particular in the sector-like illustration of FIG. 2. As a result, the cathode layer adjacent to the outermost anode layer can react with all of the anode material of the outermost anode layer without anode material being left over after the cell has become discharged, since the outermost anode layer has no counter-cathode on its outer side.

FIG. 3 furthermore shows that a respective separator 10 is disposed on both sides of the anode 8, which comprises the two anode strips 8', 8". The separators 10 comprise microfibers, especially micro glass fibers. These fibers essentially have diameters of between 0.5 and 4 micrometers, with larger and smaller diameters not having any adverse effect. In a wet flow process, the fibers are formed into a dense paper. In order to increase both the mechanical stability as well as the density of the fabric, with an increased density serving to prevent the anode strips 8', 8" from pressing through out of the soft lithium, the fibers are fastened together, and in particular via an organic binder in the form of butadiene rubber that is contained in concentrations of from 2 to 10% by weight of the microfibers. The binder is added to the pulp as a dispersion, and is flocked or coagulated with charged polyelectrolyte immediately prior to placement of the fabric. The binder can, for example, comprise a mixture of up to 40% acrylonitrile, up to 5% methacrylic acid, and up to 55% butadiene.

The finished electrode packet is then illustrated in FIGS. 6 and 7. In this connection, the cathode 9 is placed upon the anode packet 11 of FIGS. 3 to 5. The cathode 9 primarily comprises a metal conductor in the form of an expanded metal or metal mesh grid 13 in which the cathode material, for example $MnO_2$ for a cathode of solid material, is set. In a manner similar to the shunt strip 12 of the anode 8, the metal mesh grid 13 is also provided with connections or terminals.

The electrode packet 7 formed in this manner is helically wound in the direction of winding W, whereby in FIG. 6 the reference line B is indicated prior to the start of winding. The thus wound electrode packet 7 is then placed in the casing 2 of the cell 1, as illustrated in FIG. 2 and previously described.

Figure 8:
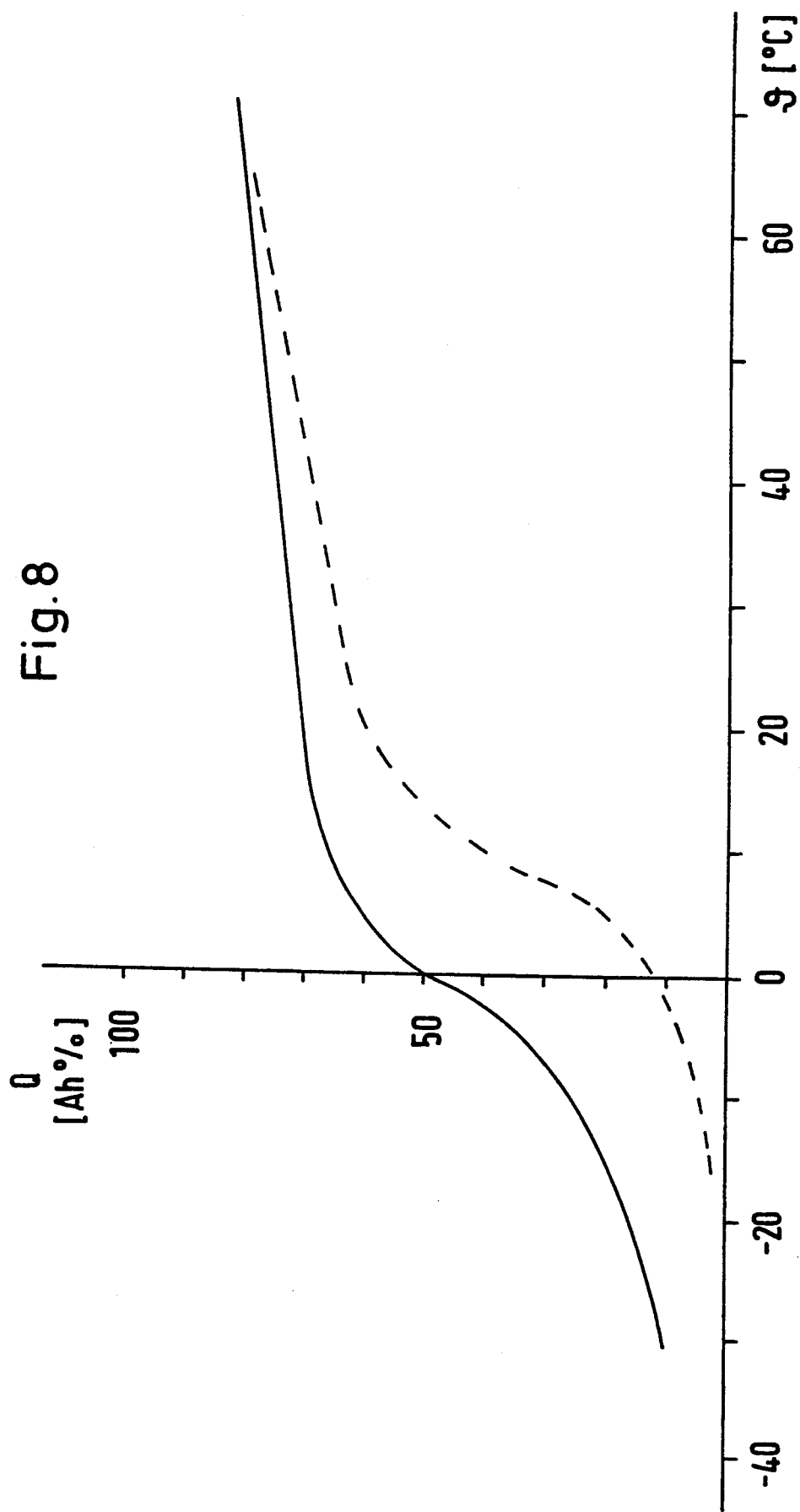
FIG. 8 is a graph relating to the pertaining electrolyte that is used for the inventive electrochemical cell.

The electrochemical cell 1 is furthermore provided with an organic electrolyte that is chemically compatible with the binder of the separator 10. This electrolyte is an organic solvent mixture of ethylene carbonate and dioxolane in which is dissolved a conducting salt in the form of the salt of perchloric acid. This electrolyte exhibits a significantly better power performance at low temperatures than does the conventional electrolyte. This is illustrated in the graph of FIG. 8, where the overall capacity Q of the electrochemical cell 1 relative to 100% Ah (ampere hour) is plotted against temperature ($\theta$). Used for this graph was a lithium cell having a surface current of 15 mA/cm$^2$ and a COV of 2 V.

The dashed-line curve represents the temperature characteristic of a conventional electrolyte, whereas the solid-line curve indicates the temperature characteristic of the inventive electrolyte. This clearly shows that with the novel electrolyte, the temperature characteristic below 0° C. is much better than the temperature characteristic of the conventional electrolyte.

The present invention is, of course, in no way restricted to the specific disclosure of the specification and drawings, but also encompasses any modifications within the scope of the appended claims.

What I claim is:

1. In an electrochemical cell particularly of winding construction, where the electrodes, namely the anode and the cathode, accompanied by the respective interposition of separators, are disposed collectively in a circular arrangement in layers progressively from the inside toward the outside, comprising the improvement therewith wherein:

the most outwardly disposed electrode layer of said cell has a thickness that is less than the thickness of each respectively more inwardly disposed electrode layer of said cell;

said separators being comprised of microfibers that are set view a binder;

said electrochemical cell including an organic electrolyte, said electrolyte being an organic solvent mixture of ethylene carbonate and dioxolane in which is dissolved a conducting salt in the form of a salt of perchloric acid.

2. An electrochemical cell according to claim 1, in which said most outwardly disposed electrode layer of said cell has a thickness that is essentially half the thickness of each corresponding more inwardly disposed electrode layer of said cell.

3. An electrochemical cell according to claim 1, in which said microfibers are micro glass fibers.

4. An electrochemical cell according to claim 1, in which said binder of said separator is a butadiene rubber.

5. An electrochemical cell according to claim 4, in which said butadiene rubber contains up to 40% acrylonitrile, up to preferably 5% methacrylic acid, and up to preferably 55% butadiene.

6. An electrochemical cell according to claim 1, in which the content of said binder is between 2 and 10% by weight of said microfibers.

7. An electrochemical cell according to claim 6, in which the content of said binder is 7% by weight of said microfibers.

8. An electrochemical cell according to claim 1, in which said separator has a weight per unit area of approximately 50 g/m$^2$.

9. An electrochemical cell according to claim 1, in which said electrolyte solvent mixture contains a solution of 1 mol ethylene carbonate and approximately 11 mol 1,3 dioxolane.

10. An electrochemical cell according to claim 1, in which said conducting salt is dissolved in said solvent mixture in a proportion of up to 1 to 2.5 mol/l.

11. An electrochemical cell according to claim 10, in which said conducting salt is dissolved in said solvent mixture in a proportion of up to 1.75 to 2 mol/l.

* * * * *